US005651330A

United States Patent [19]
Jewett

[11] Patent Number: 5,651,330
[45] Date of Patent: Jul. 29, 1997

[54] SHIPPING CONTAINER FOR SHIPPING LIVESTOCK

[76] Inventor: Larry Hayward Jewett, R.R. #3, Mouth of Keswick, New Brunswick, Canada, E0H 1N0

[21] Appl. No.: 404,514

[22] Filed: Mar. 15, 1995

[30] Foreign Application Priority Data

Feb. 9, 1995 [CA] Canada .................. 2142161

[51] Int. Cl.⁶ .................. B60P 3/03; B61D 3/00
[52] U.S. Cl. .................. 119/408; 119/412; 296/24.2; 280/DIG. 8
[58] Field of Search .................. 119/408, 409, 119/410, 411, 412, 413, 414, 415, 496, 500; 296/24.2; 280/DIG. 8, 901

[56] References Cited

U.S. PATENT DOCUMENTS

| 96,500 | 11/1869 | Street | 119/412 |
| 468,646 | 2/1892 | Dow | 119/408 |
| 3,530,830 | 9/1970 | Smith . | |
| 3,741,529 | 6/1973 | Blagg | 296/24.2 |
| 3,824,958 | 7/1974 | Parady, Jr. | 119/410 |
| 4,168,933 | 9/1979 | Kane | 119/412 |
| 5,109,999 | 5/1992 | Instone . | |

FOREIGN PATENT DOCUMENTS

| 624441 | 7/1961 | Canada . | |
| 1648818 | 5/1991 | U.S.S.R. | 296/24.2 |

Primary Examiner—Todd E. Manahan
Attorney, Agent, or Firm—Morgan & Finnegan, L.L.P.

[57] ABSTRACT

A shipping container for shipping livestock includes a structural main body having a floor, side walls, a closed end wall, a gated end wall, and a roof, all enclosing an interior space. The interior space of the main body is selectively apportioned by one or more gates into one or more stalls for livestock. Each gate has an integral door. As well, a storage member is provided to accommodate the storage of a sufficient quantity of feed to permit substantially self-sufficient operation of the container during shipment over long distances.

8 Claims, 4 Drawing Sheets

SHIPPING CONTAINER FOR SHIPPING LIVESTOCK

The present invention relates to the field of shipping containers. In particular, the present invention provides an improved shipping container for the transportation of livestock, and a method of transporting livestock.

In transporting livestock, it is desirable to do so by way of a shipping container that can be loaded onto a tractor-trailer rig, a train car or an ocean or lake freighter. Use of a container minimizes time lost in transferring a load from one mode of transportation to the next, and optimizes the load carrying ability of the vehicle or vessel involved.

However, there have been significant drawbacks to the use of containers for shipping livestock, in spite of the development of several different containers for that very purpose. U.S. Pat. No. 3,530,830 for instance, describes a container for shipping livestock, including an upper rack for storing bedding hay, and including a feeding and a watering station. As a living space for one or two animals, the container would be adequate, but it lacks storage capacity for a feed supply to last through an extended voyage on a ship, which can be two weeks or more. Moreover, the conventional ventilation described in this patent, a series of apertures in the body of the container, is entirely passive and may not be adequate to keep the container well aired. Also, the conventional distribution of ventilation apertures will permit the escape of faeces from the container, resulting in uncontained, unsanitary conditions on a ship: both a health hazard and a factor having negative impact on the time necessary to clear customs.

In U.S. Pat. No. 5,109,999, a horse shipping container with a collapsible roof is described. This container also advantageously includes a separate door for access to the interior by a groom, and a groom's compartment in the container. A principal feature of the container of this patent is its versatility, and it is designed so as to be configurable for general freight shipping, and also collapsible for shipment as freight if necessary in a minimum of space. It is intended particularly as an air-freight container, and so it will be observed that the requirements it addresses are versatility and compactness.

In contradistinction to the prior art discussed above, the present invention provides a container substantially dedicated to livestock shipment, primarily for tractor-trailer, rail and ocean going container carrying vessels. Moreover, the container of the present invention is designed to efficiently carry livestock and their bedding and feed together in the same standard sized container, while still permitting a configuration that includes a working space for a groom or handler.

Furthermore, the present invention addresses the heretofore conflicting aims of ensuring adequate ventilation for the health and safety of livestock, and providing a container that adequately and sanitarily contains animal faecal waste.

In addition, the container of the present invention is designed to be configured in a novel series of stalls separated by side hinged gates incorporating man-passage doors. The design permits the entire container to be thoroughly cleaned out very quickly and efficiently, relative to previous designs.

In a broad aspect, then, the present invention relates to a shipping container for shipping livestock, including: (a) a structural main body having a floor, side walls, a closed end wall, a gated end wall, and a roof, all enclosing an interior space; (b) means selectively to apportion the interior space of said main body into one or more stalls for livestock; (c) means to accommodate the storage of a sufficient quantity of feed to permit substantially self-sufficient operation of a said container during shipment over long distances.

In another broad aspect, the present invention relates to a method of transporting livestock over a substantially long distance, which comprises furnishing a supply of compressed hay in the feed supply storage means of the container of the present invention, and transporting a desired number of livestock in said container, utilizing said compressed hay to feed same during shipment.

In drawings that illustrate the present invention by way of example:

Figure 1:
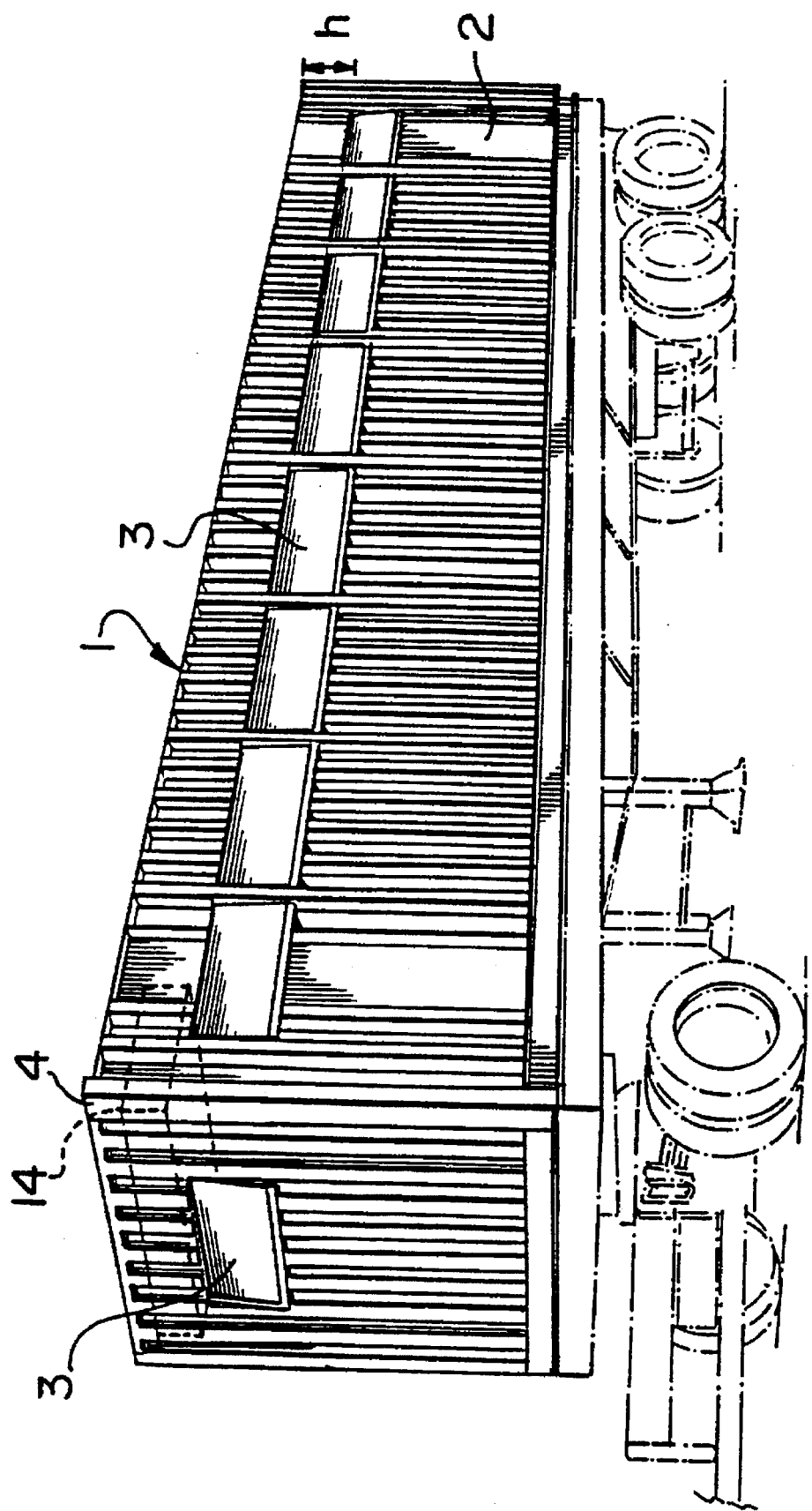
FIG. 1 is a perspective view from the closed end of a container embodying the present invention, mounted on a flat-bed trailer.

Referring now to the drawings in general, which will be discussed collectively, as they show views of the same container 1, the container 1, in overall shape and size is dimensioned as a standard shipping container that may be mounted on a flat-bed trailer T, as shown in FIG. 1, or may be transported on a train car or in a ship equipped for container storage.

The container 1 is constructed of heavy duty channelled sheet steel (or similar) walls 2 that are provided with shuttered ventilation openings 3 substantially along their length, and at the closed end 4 of the container 1. The shuttered openings 3 are located at a height selected so that an animal to be transported in the container cannot defecate or urinate through the opening. The shuttered openings are closable by a series of shutters 5 accessible from inside the container. The shutters are laterally slidable in frames in the openings 3 of the container.

Figure 4:
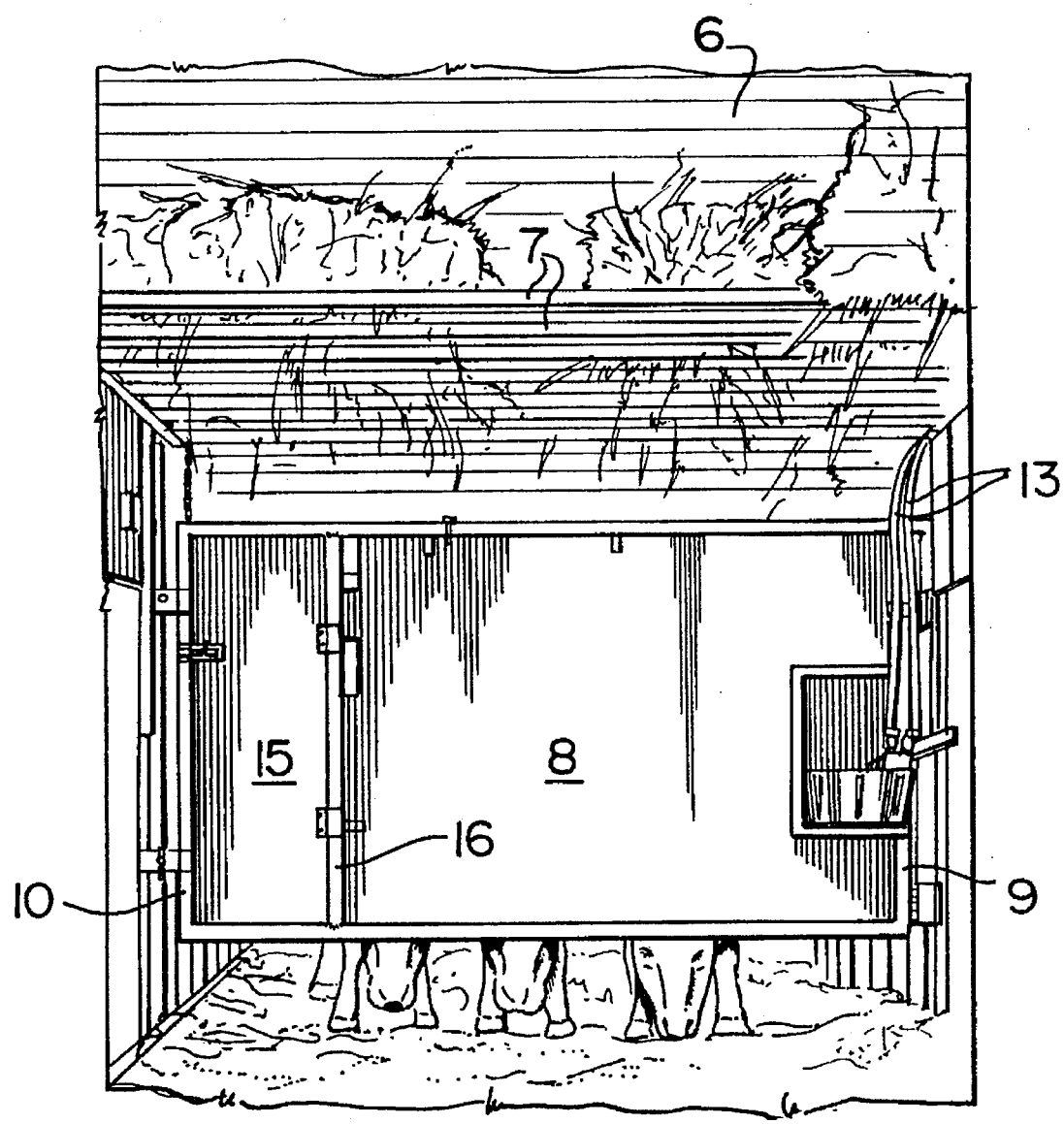
FIG. 4 is an interior perspective view of the container shown in FIG. 1, from the openable end to the closed end thereof, with an interior gate thereof shown in the closed position, and with livestock and feed/bedding shown therein.

As can best be seen in FIG. 4, the integral hay rack 6 occupies the space above and between the shuttered openings 3 of the side walls 2 of the container. Hay rack 6 is constructed of a series of laterally extending beams 7 made from any suitable material such as wood, aluminium, steel or glue-lam composite. It is dimensioned to accommodate a supply of hay, in a compressed form, sufficient for feed and bedding for an approximately twelve day voyage. It will be understood that the economic feasibility of shipping livestock by container depends on the ability of the container to accommodate livestock on virtually its entire floor area (except for a small working compartment for an attendant located at the openable end of the container). Therefore, the novel approach of the present invention, of providing overhead storage for compressed hay, provides an economical and efficient livestock shipping container. Moreover, it will be appreciated that different designs are possible to permit use of the container of the present invention on voyages longer than twelve days (selected as typical of a trans-Atlantic voyage). In particular, the present invention contemplates a container having a greater overall height by increasing the height H of the hay rack 6 (see FIG. 1).

Figure 3:
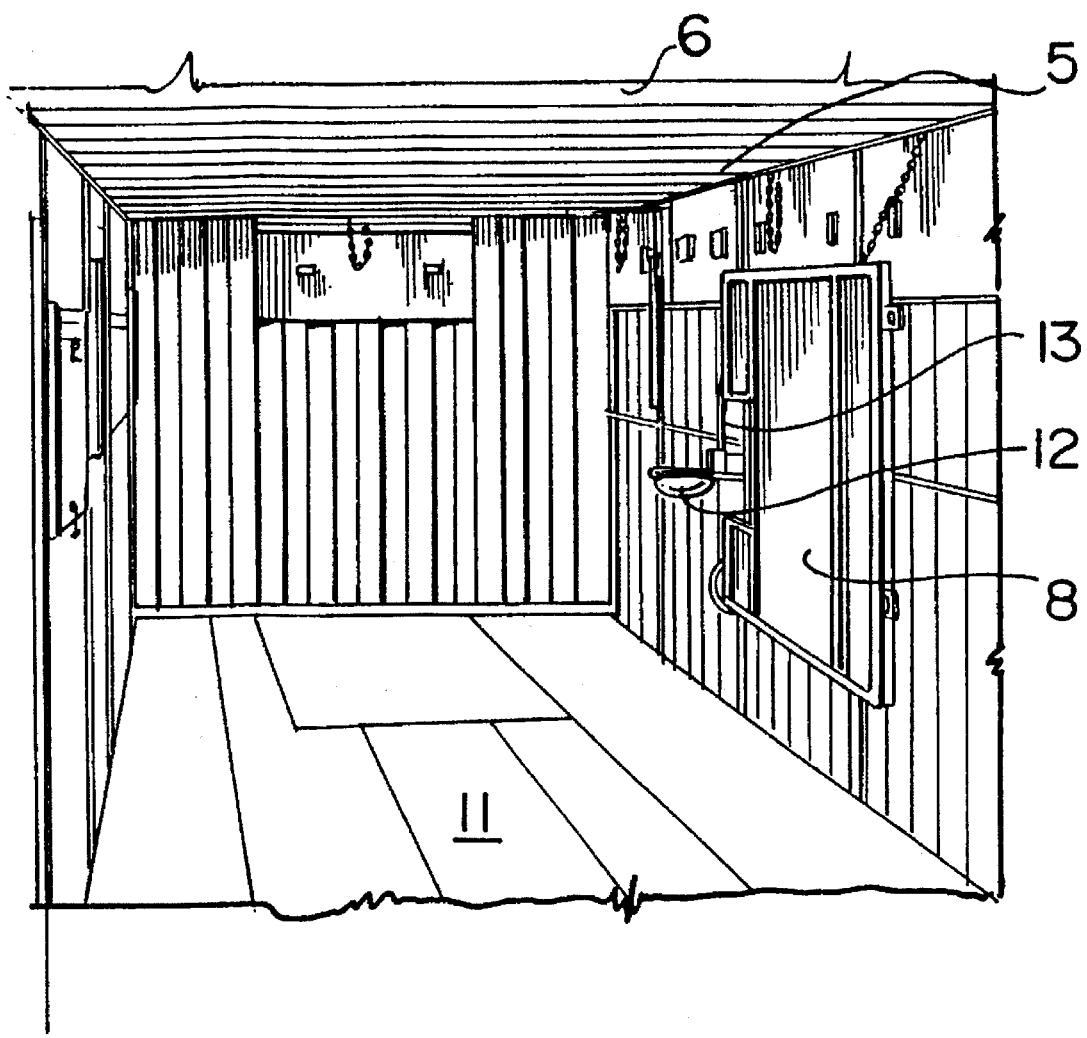
FIG. 3 is an interior perspective view, from the openable end to the closed end, of the container shown in FIG. 1, with only one interior gate shown therein, and with the container empty.

Referring to FIGS. 3 and 4, it will be observed that the container 1 is provided with one or more internal gates 8 the function of which is to divide the container into a number of stalls for livestock. Each gate is hinged to a side wall 2 of the container at one edge thereof and is releasably latched to the opposing side wall 2 at the opposite edge 10 thereof. Both hinging and latching mechanisms are conventional. The gate 8 is not full-height, to assist in permitting free flow of air, and there is, consequently, a gap between the floor 11 and the lower edge of gate 8 and the hay rack 6 and the top edge of the gate 8.

The side wall of the container to which the gate(s) 8 is hinged is provided, at predetermined intervals with conventional hinging components for the gate, and a plumbed-in water basin 12 connected by water lines 13 to a cistern 14 (shown in phantom in FIG. 1) located in the hay-rack in the closed end of the container, or at any other conventional and suitable location. As can be seen in FIG. 4, the edge 9 of the gate 8 in the vicinity of the water basin is cut way whereby a single water basin 12 can be accessed by livestock in two adjacent stalls that are separated from one another by a gate 8.

Figure 2:
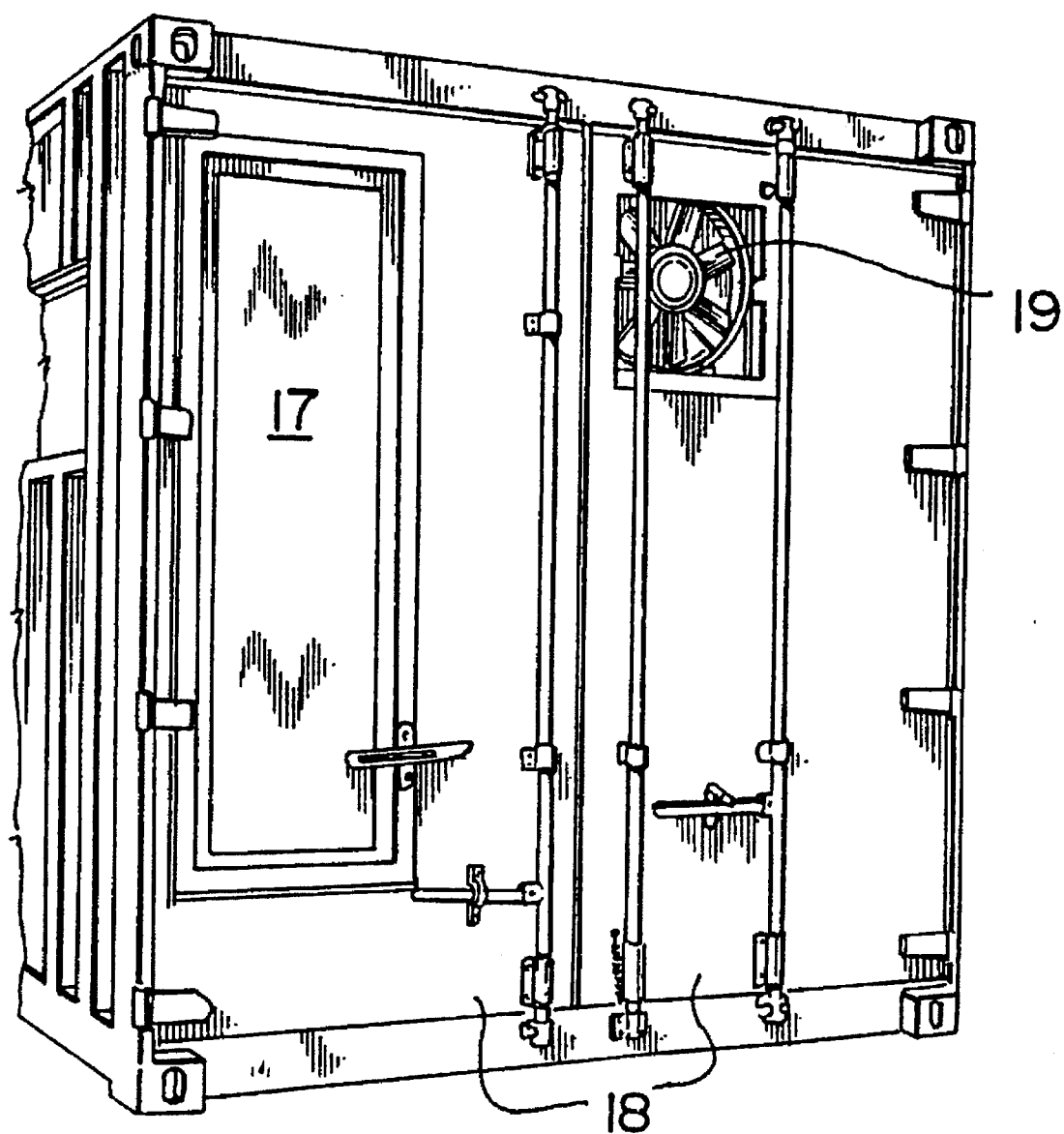
FIG. 2 is an end view of the openable end of the container shown in FIG. 1.

As can also best be seen in FIG. 4, a man passage is framed into each gate 8 at the side thereof opposite that water basin 12. The man passage is defined by a door frame 16 built into the gate 8, in which is hung a door 15. An attendant can, therefore, pass from stall to stall without unlatching or swinging the gate 8. Moreover, it will be observed from FIG. 2 that the man-passage continues fully to the end of the container, where an ingress/egress door 17 is provided in the one of the standard container doors 18. Moreover, in one of these doors 18, or in any other desired location in the container, a ventilation fan 19, electrically powered, is provided. It will be understood that the container is connected to a source of electricity, to power the fan, and the electrical lighting (not shown) in the interior.

It is to be understood that the examples described above are not meant to limit the scope of the present invention. It is expected that numerous variants will be obvious to the person skilled in the field of livestock handling and shipping without any departure from the spirit of the invention. The appended claims, properly construed, form the only limitation upon the scope of the invention.

I claim:

1. A shipping container for shipping livestock, including:
   a) a structural main body having a floor, side walls, a closed end wall, a gated end wall, and a roof, all enclosing an interior space;
   b) means selectively to apportion the interior space of said main body into one or more stalls for livestock including one or more gates hinged to a selected one of the side walls of the container, and latchable to the opposite side wall, each said gate being provided with an integral door for a human to pass through without manipulation of said gate; and
   c) means to accommodate the storage of a sufficient quantity of feed to permit substantially self-sufficient operation of said container during shipment over long distances.

2. A shipping container for shipping livestock as described in claim 1, wherein said side walls are provided with closable ventilation openings at a height selected to exceed the height at which the livestock for which the container is intended discharges waste materials, and said container is provided with a ventilation fan.

3. A shipping container for shipping livestock as described in claim 2, wherein said means to accommodate the storage of feed is located in overhead racks extending between the side walls of the container, substantially the entire length of the container, above the level of the said ventilation opening.

4. A shipping container for shipping livestock, as claimed in claim 2, wherein said container is a standard sized container for storage on a container ship.

5. A shipping container for shipping livestock as claimed in claim 3 wherein watering means for said livestock are provided in said interior space, at the location of the hinges for said gate or gates, and each said gate is adapted to permit an animal from each stall adjacent said gate to access said water.

6. A shipping container for shipping livestock, as claimed in claim 5, wherein said container is a standard sized container for storage on a container ship.

7. A shipping container for shipping livestock, as claimed in claim 3, wherein said container is a standard sized container for storage on a container ship.

8. A shipping container for shipping livestock, as claimed in claim 1, wherein said container is a standard sized container for storage on a container ship.

* * * * *